(12) United States Patent
Henderson

(10) Patent No.: US 6,634,691 B2
(45) Date of Patent: Oct. 21, 2003

(54) COMPARTMENTALIZED STORAGE CONTAINER

(75) Inventor: Jack V. Henderson, West Bloomfield, MI (US)

(73) Assignee: Decoma International Inc., Concord (CA)

(*) Notice: Subject to any disclaimer, the term of this patent is extended or adjusted under 35 U.S.C. 154(b) by 0 days.

(21) Appl. No.: 10/045,982

(22) Filed: Oct. 29, 2001

(65) Prior Publication Data

US 2002/0130527 A1 Sep. 19, 2002

Related U.S. Application Data

(60) Provisional application No. 60/245,415, filed on Nov. 2, 2000.

(51) Int. Cl.[7] .................................................. B60P 7/02
(52) U.S. Cl. ............................... 296/37.6; 296/100.06; 296/100.17; 224/404
(58) Field of Search ............................... 296/37.6, 39.2, 296/100.06, 100.09, 100.17; 224/403, 404

(56) References Cited

U.S. PATENT DOCUMENTS

| | | | | |
|---|---|---|---|---|
| 4,469,364 A | * | 9/1984 | Rafi-Zadeh | 296/37.6 |
| 4,830,242 A | * | 5/1989 | Painter | 296/37.6 |
| 4,832,394 A | * | 5/1989 | Macomber | 296/100.06 |
| 4,844,305 A | * | 7/1989 | McKneely | 296/37.6 |
| 4,958,876 A | * | 9/1990 | Diaco et al. | 296/39.2 |
| 5,094,375 A | * | 3/1992 | Wright | 224/404 |
| 5,154,478 A | | 10/1992 | Erickson et al. | |
| 5,207,470 A | * | 5/1993 | Rafi-Zadeh | 224/404 |
| 5,265,993 A | * | 11/1993 | Wayne | 296/39.2 |
| 5,366,124 A | * | 11/1994 | Dearborn, IV | 296/37.6 |
| 5,427,428 A | * | 6/1995 | Ericson et al. | 296/100.09 |
| 5,564,773 A | * | 10/1996 | Lapsley et al. | 296/100.06 |
| 5,899,544 A | * | 5/1999 | James et al. | 296/37.6 |
| 5,964,492 A | | 10/1999 | Lyon | |
| 6,003,923 A | | 12/1999 | Scott et al. | |
| 6,024,402 A | * | 2/2000 | Wheatley | 224/403 |
| 6,092,852 A | | 7/2000 | Lawrence | |
| 6,106,051 A | * | 8/2000 | Miskowic | 296/100.06 |
| 6,203,086 B1 | * | 3/2001 | Dirks et al. | 296/37.6 |
| 6,224,138 B1 | * | 5/2001 | Adsit et al. | 296/37.6 |
| 6,234,559 B1 | * | 5/2001 | Block et al. | 296/37.6 |
| 6,325,439 B1 | * | 12/2001 | Crossman | 296/37.6 |
| 6,328,365 B1 | * | 12/2001 | Adsit | 296/37.6 |

* cited by examiner

Primary Examiner—D. Glenn Dayoan
Assistant Examiner—Jason Morrow
(74) Attorney, Agent, or Firm—Clark Hill PLC

(57) ABSTRACT

A storage assembly for a vehicle includes an open bed defined by opposing sidewalls, a front wall and a rear tailgate. The storage assembly also includes a tonneau cover that covers at least a portion of the open bed. The tonneau cover is movable between open and closed positions to provide selective access to the open bed. A plurality of brackets extends between the opposing sidewalls, the front wall and the rear tailgate. A storage bin is removably securable to the plurality of brackets. The storage bin creates a removable compartment within the open bed allowing items stored therein to be organized and removed as a group when desired.

12 Claims, 5 Drawing Sheets

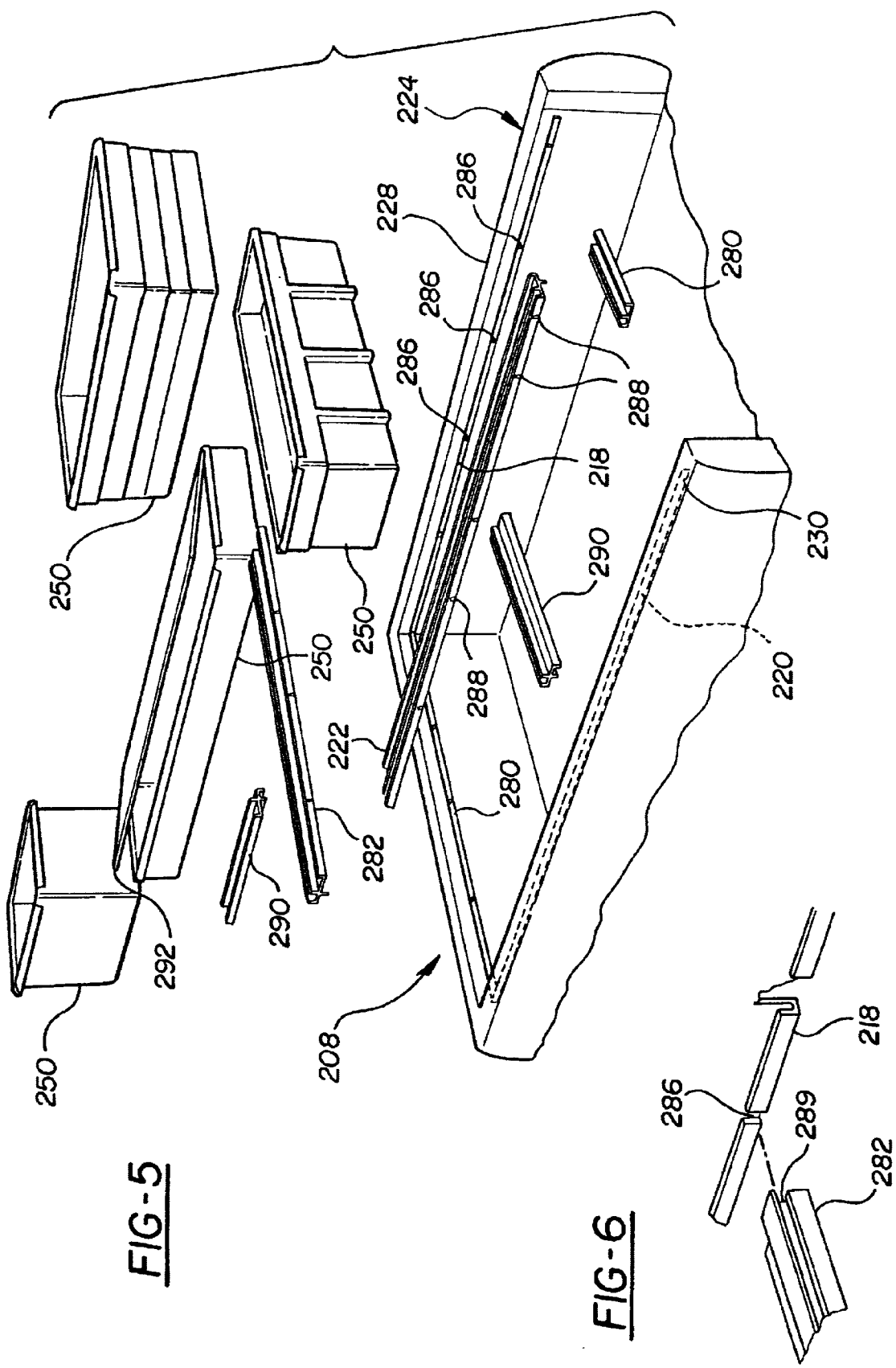

COMPARTMENTALIZED STORAGE CONTAINER

CROSS-REFERENCE TO RELATED APPLICATIONS

This application claims the benefit of U.S. Provisional Application No. 60/245,415 filed Nov. 2, 2000.

BACKGROUND ART

1. Field of the Invention

The invention relates to a storage container. In particular, this invention relates to a storage container which has adjustable storage areas and is supported by attachment brackets of a tonneau cover assembly.

2. Description of the Related Art

Tonneau covers are becoming increasingly popular as an added option for pickup trucks. The tonneau cover overlies the cargo bed of the pickup truck to provide covered storage in the bed and also improve vehicle aerodynamics.

Storage containers in multiple shapes and sizes are also increasing in popularity for pickup trucks, sports utility vehicles, and the like. Storage containers allow for storage of items without the items being able to slide around, become damaged, or spill.

U.S. Pat. No. 6,234,559 B1 discloses a rigid tonneau cover. The tonneau cover is fabricated with an integral storage box. The integral storage box provides a smaller compartment to place items that it is desired to not have them shifting around. The tonneau cover with an integral storage box is, however, limited in its ability to organize the cargo bed of a pickup truck because it is not versatile. There are times when additional storage containers are needed. Further, there are times when storage containers of different sizes are needed for a particular task. Therefore, a need exists for a more versatile system for organizing a cargo bed of a pickup truck.

SUMMARY OF THE INVENTION

A storage assembly is disclosed for a vehicle having an open bed defined by opposing sidewalls, a front wall and a rear tailgate. The storage assembly includes a tonneau cover that covers at least a portion of the open bed. The tonneau cover is movable between open and closed positions to provide selective access to the open bed. A plurality of brackets extend between the opposing sidewalls, the front wall and the rear tailgate. A storage bin is removably securable to the brackets. The storage bin creates a removable compartment within the open bed allowing items stored therein to be organized and removed as a group when desired.

BRIEF DESCRIPTION OF THE DRAWINGS

Advantages of the invention will be readily appreciated as the same becomes better understood by reference to the following detailed description when considered in connection with the accompanying drawings, wherein:

FIG. 5 is an exploded view of an alternative embodiment of the invention and a portion of an open bed of a pickup truck; and FIG. 6 is a perspective view, partially cut away of two brackets incorporated into the alternative embodiment of the invention.

DETAILED DESCRIPTION OF THE PREFERRED EMBODIMENT

Figure 1:
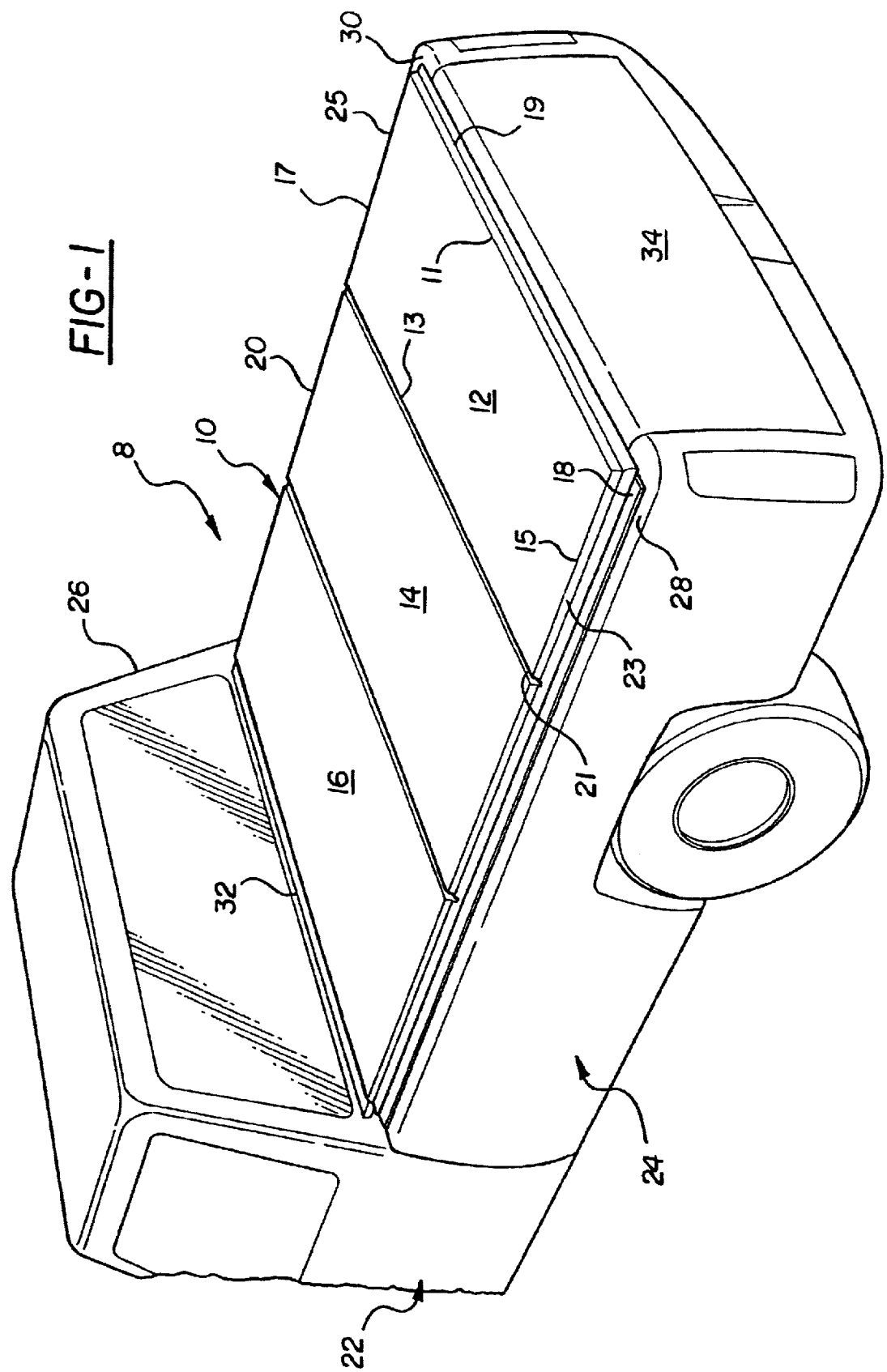
FIG. 1 is a perspective view of a pickup truck with the tonneau cover of the present invention illustrated in the closed position.

Referring to FIG. 1, a storage assembly 8 is generally illustrated. The storage assembly 8 generally includes a tonneau cover 10 having a plurality of panels 12, 14, 16 and a plurality of brackets 18, 20, 80, 82. The panels 12, 14, 16 are similar in design. Therefore, only one panel 12 will be described.

The panel 12 is generally planar and includes front, rear, and two side edges 11, 13, 15, 17. Furthermore, each edge 11, 13, 15, 17 includes a downward facing flange 19, 21, 23, 25. The panels 12, 14, 16 can be made of any suitable material such as FRP or other known foam composite constructions.

A pickup truck is generally shown at 22 in FIG. 1. The pickup truck 22 has a truck bed 24 generally extending from behind a passenger cab 26 of the pickup truck 22 and includes two opposed and generally parallel sidewalls 28, 30 interconnected and spaced apart by a fixed forward wall 32 and a movable rear tailgate 34. The truck bed 24 is an open bed. Preferably, the panels 12, 14, 16 are equally sized and have a width slightly greater than the width of a truck bed 24. The combined length of the panels 12, 14, 16 are such that the truck bed 24 is fully covered by the tonneau cover 10 when in a closed position as shown in FIG. 1.

Two of the plurality of brackets 18, 20, 80, 82 are side brackets 18, 20. The side brackets 18, 20 are mirror images of each other and, thus, only the bracket 20 will be described.

Figure 2:
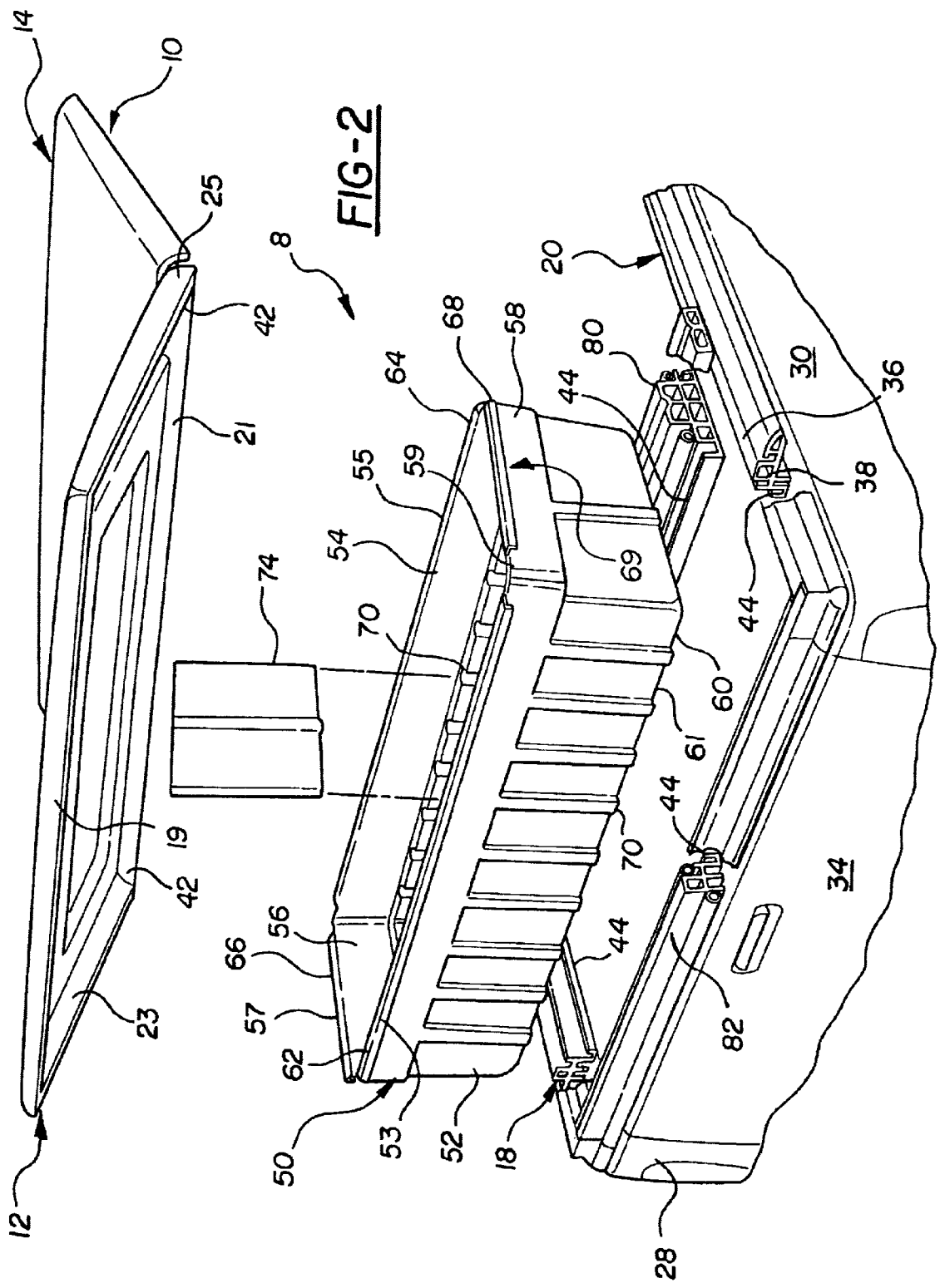
FIG. 2 is a partially exploded perspective view of the pickup truck with the tonneau cover in an open position and providing access to a storage container secured within the cargo bed of the pickup truck.

Referring to FIG. 2, the side bracket 20 is elongated and extends the length of wall 30. The bracket 20 has a generally L-shaped cross section having a generally horizontal upper flange 36 and a generally vertical flange 38. The corner between the flanges 36, 38 defines an upwardly extending guide 40. Preferably, guide 40 and vertical flange 38 extend into the volume of the truck bed, i.e., inwardly of the walls 28, 30 of the pickup truck 22. The guides 40 are positioned to receive the downward facing flanges 19, 21, 23, 25 of the panels 12, 14, 16. The vertical flange 38 further includes an upwardly facing L-shaped flange 44 which extends the length of bracket 20.

Two of the plurality of brackets 18, 20, 80, 82 are cross car brackets 80, 82 that extend from sidewall 28 to sidewall 30 to provide support and a pivot for two of the panels, i.e., panels 12, 14. The cross bar bracket 80 is generally rectangular in cross section. The cross car bracket 80 further has an identical L-shaped flange 44 as described on bracket 20. The cross car bracket 82 has a similar shape and function as that of bracket 20, including the L-shaped flange 44.

A storage bin or container 50 includes a generally rectangular shape which is formed from any suitable material such as a thermoset or thermoplastic resins. The storage container 50 includes a generally planar and rectangular bottom portion 60 defined by a peripheral edge 61. Generally vertical sidewalls 52, 54, 56, 58 extend upwardly from the peripheral edge 61 to a top portion 53, 55, 57, 59 respectfully defining a generally rectangular peripheral opening into the storage container 50. The top portion 53, 55, 57, 59 of each vertical wall 53, 55, 57, 59, includes an L-shaped flange 62, 64, 66, 68 which generally extends the length of each of the walls 52, 54, 56, 58. The flanges 62, 64, 66, 68 define a support lip, generally shown at 69, that extends perpendicularly from the wall 52, 54, 56, 58 and projects downwardly for mating engagement with the upwardly facing L-shaped flanges 44 of the brackets 18 and 20.

Each storage container wall 52, 54 further has a plurality of ribs 70 equally spaced apart, which can be molded in or created by other means, for receiving and supporting one or more removable side panels 74 between the opposing walls 52, 54. The removable side panel 74 allows for the customization of the storage container 50 by creating different sized storage areas therein.

In operation, the tonneau cover 10 may be pivoted from the closed position of FIG. 1 to the open position of FIG. 2 exposing each bracket 18, 20, 80, 82 and the associated flanges 44. The storage container 50 is then set into place, resting the flanges 62, 64, 66, 68 of the storage container 50 against the flanges 44 of the brackets 18, 20, 80, 82 to hold the storage container 50 in place. The side panel 74 may then slide between a rib 70 located on the wall 52 and a correspondingly aligned rib 70 on the opposite wall 54 to adapt the holding capacity of the storage container 50 to a desired amount. It should be noted that all attachment flanges may not be necessary to the support and function of this design.

Figure 3:
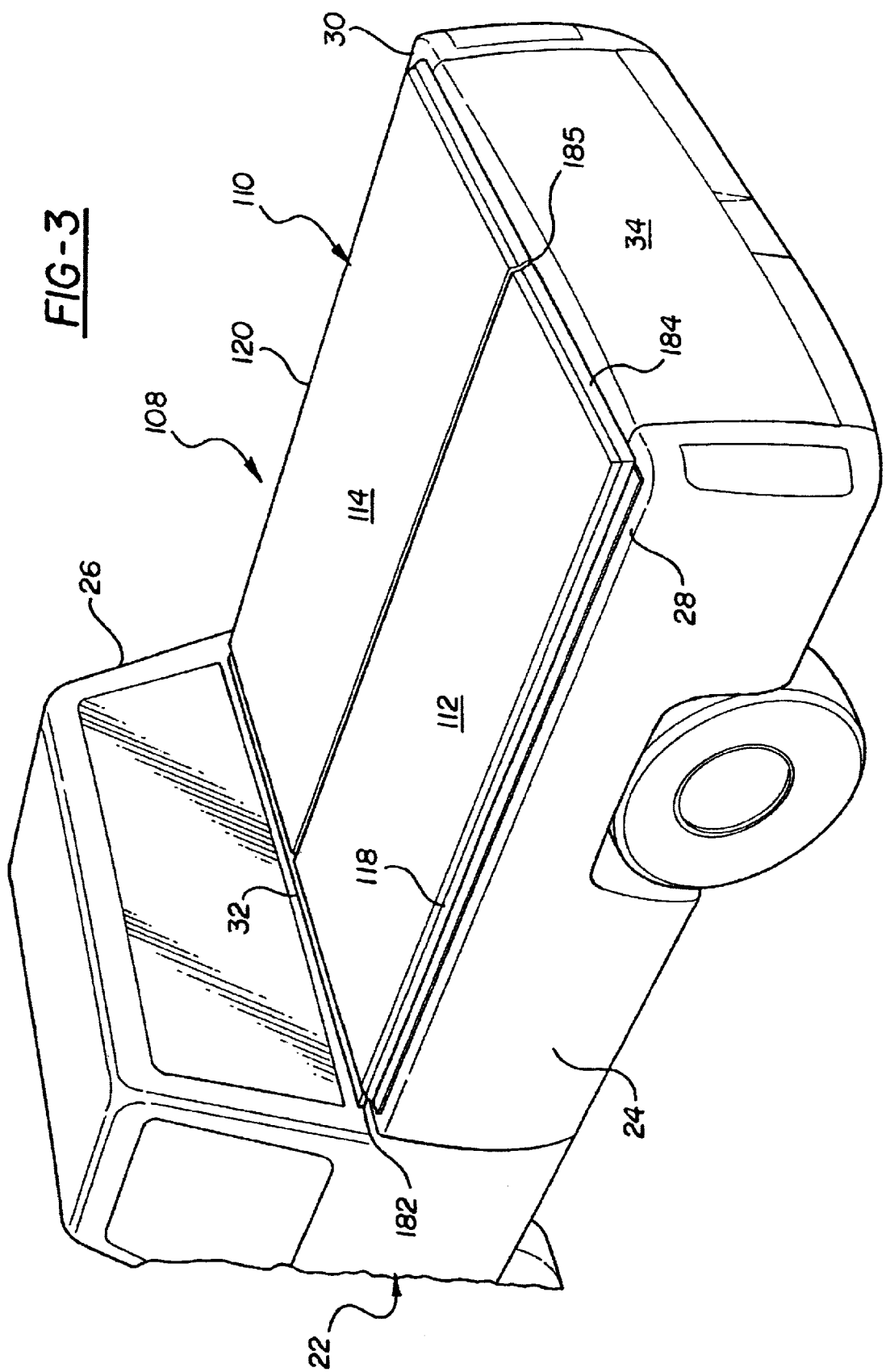
FIG. 3 is a perspective view of the pickup truck with an alternative tonneau cover of the present invention illustrated in the closed position.
Figure 4:
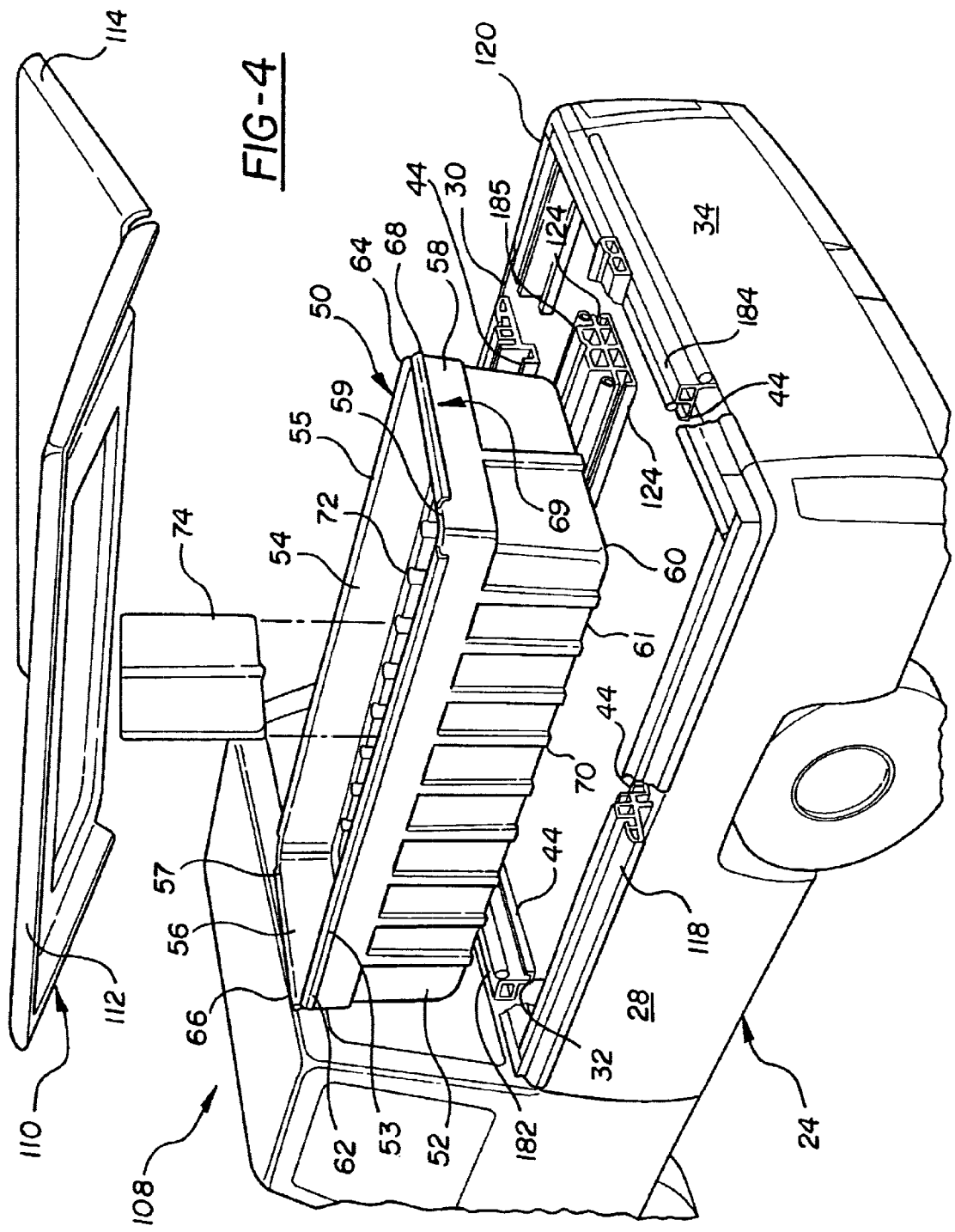
FIG. 4 is a partially exploded perspective view of the pickup truck of FIG. 3 with the tonneau cover in an open position and providing access to a storage container secured within the cargo bed of the pickup truck.

Referring to FIGS. 3 and 4, an alternative storage assembly 108 and tonneau cover 110 are shown. The tonneau cover 110 generally comprises two rigid panels 112, 114, side brackets 118, 120, front and rear cross car brackets 182, 184, and a center bracket 185. The two rigid panels 112, 114 are of similar function and design as panels 12, 14, 16 described above. The side brackets 118, 120 are mirror images of each other and are similar in function and design as brackets 18, 20. The front and rear cross brackets 182, 184 are mirror images of each other and are similar in function and design as bracket 82. Additionally, a center bracket 185 exists as a support and a pivot for each panel 112, 114. The center bracket 185 is generally rectangular in cross section and extends from the forward wall 32 to the tailgate 34. The center bracket 185 further has an upwardly facing L-shaped flange 124 extending perpendicularly from the bracket 185 towards each of the truck sidewalls 28, 30 and extends the length of the center bracket 185.

Referring to FIG. 4, the center mounted tonneau cover 10 may be pivoted from the closed position of FIG. 3 to the open position of FIG. 4 exposing each bracket 118, 120, 182, 184, 185 and the associated flanges 44, 124. The storage container 50 is then set into place, resting the flanges 62, 64 of the storage container 50 against the flanges 44, 124 of the brackets 118, 182, 184, 185 to hold the storage container 50 in place. The side panel 74 may then slide between a rib located on the wall 52 and a correspondingly aligned rib 70 located on the wall 52 and a correspondingly aligned rib 70 on the opposite wall 54 to adapt the holding capacity of the storage container 50 to a desired amount. It should be noted that all attachment flanges may not be necessary to the support and function of this design.

Referring to FIGS. 5 and 6 wherein like elements are offset by one hundred from those described above, the storage assembly 208 includes a plurality of brackets 218, 220, 280, 282 that extend along and across the open bed 224. The brackets 218, 220, 280, 282 are similar to those described above. The brackets 218, 220, 280, 282 do, however, include notches 286 therein. The notches 286 are cut into the brackets 218, 220, 280, 282 to allow the position of the cross car brackets 280 to be adjusted with respect to the side brackets 218, 220 and the cross car brackets 280, 282. A longitudinal cross car or center bracket 285 includes notches 288 on the underside thereof allowing the center bracket 285 to extend over any cross car brackets 280. The notches 286 receive tongues 289 that extend out of the ends of the cross car brackets 280, 282, 285. The tongues 289 have a width less than a width of the notches 286.

In addition to the cross car brackets 280, 282, there are partial cross car brackets 290. The partial cross car brackets 290 extend from one edge of the open bed 224 to another cross car bracket 280, 282 or the center bracket 222.

The storage bins 250 may come in various sizes and depths. While some of the storage bins 250 may extend from the brackets 218, 220, 280, 282, 285 to a floor (not shown) of the open bed 224, others may not. Further, some of the storage bins 250 may have individual bin covers 292 that may be secured thereto or extend out from the storage bin 250 through a living hinge.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

What is claimed is:

1. A storage assembly for a vehicle having an open bed defined by opposing sidewalls, a front wall and a rear tailgate, said storage assembly comprising:

a tonneau cover for covering at least a portion of the open bed, said tonneau cover movable between an open position providing access thereunder and a closed position;

a plurality of brackets extending between the opposing sidewalls, the front wall and the rear tailgate of the open bed, each of said plurality of brackets including an L-shaped flange extending therealong; and a storage bin including a support lip matingly engaging said L-shaped flanges of a portion of said plurality of brackets to provide support for said storage bin therealong wherein said storage bin is removably securable to said plurality of brackets for creating compartments within the open bed to organize items stored therein.

2. A storage assembly as set forth in claim 1 wherein one of said plurality of brackets is adjustable allowing said storage bin to be replaced by another storage bin differing in size from said storage bin.

3. A storage assembly as set forth in claim 2 wherein a portion of said plurality of brackets includes positioning notches for providing positioning for another portion of said plurality of brackets.

4. A storage assembly as set forth in claim 3 wherein said tonneau cover pivots about a pivot axis to move between a closed position and an open position to provide access to said storage bin.

5. A storage assembly as set forth in claim 4 wherein said pivot axis is disposed adjacent and parallel one of said plurality of brackets.

6. A storage assembly for a vehicle having an open bed defined by opposing sidewalls, a front wall and a rear tailgate, said storage assembly comprising:

a tonneau cover for covering at least a portion of the open bed, said tonneau cover movable between an open position providing access thereunder and a closed position;

a plurality of brackets extending between the opposing sidewalls, the front wall and the rear tailgate of the open bed, each of said plurality of brackets including an L-shaped flange extending therealong and notches for positioning each of said plurality of brackets with respect to each other; and a storage bin having a support lip matingly engaging said L-shaped flanges of a portion of said plurality of brackets to provide support therealong wherein, said storage bin is removably securable to said plurality of brackets for creating compartments within the open bed to organize items stored therein.

7. A storage assembly as set forth in claim 6 wherein a portion of said plurality of brackets includes a tongue at each end thereof, said tongue receivable by said notches for abutting engagement therewith.

8. A storage assembly as set forth in claim 7 wherein one of said plurality of brackets movable with respect to other of said plurality of brackets is adjustable allowing said storage bin to be replaced by another storage bin differing in size from said storage bin.

9. A storage assembly as set forth in claim 8 wherein said tonneau cover pivots about a pivot axis to move between a closed position and an open position to provide access to said storage bin.

10. A storage assembly as set forth in claim 9 wherein said pivot axis is disposed adjacent and parallel one of said plurality of brackets.

11. A storage assembly as set forth in claim 10 including a plurality of storage bins wherein each of said storage bins defines a peripheral opening.

12. A storage assembly as set forth in claim 11 wherein said peripheral openings are of unequal dimensions.

* * * * *

UNITED STATES PATENT AND TRADEMARK OFFICE
CERTIFICATE OF CORRECTION

PATENT NO.     : 6,634,691 B2
DATED          : October 21, 2003
INVENTOR(S)    : Henderson It is certified that error appears in the above-identified patent and that said Letters Patent is hereby corrected as shown below:

<u>Column 5,</u>
Line 17, no comma after "wherein".

Signed and Sealed this

Twenty-fourth Day of February, 2004

JON W. DUDAS
*Acting Director of the United States Patent and Trademark Office*